United States Patent
Luo

(10) Patent No.: US 9,525,631 B2
(45) Date of Patent: Dec. 20, 2016

(54) PACKET FORWARDING METHOD, APPARATUS, AND SYSTEM

(71) Applicant: HUAWEI TECHNOLOGIES CO., LTD., Shenzhen (CN)

(72) Inventor: Youquan Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 14/289,055

(22) Filed: May 28, 2014

(65) Prior Publication Data

US 2014/0269729 A1 Sep. 18, 2014

Related U.S. Application Data

(63) Continuation of application No. PCT/CN2012/079705, filed on Aug. 6, 2012.

(30) Foreign Application Priority Data

Nov. 29, 2011 (CN) .......................... 2011 1 0386699

(51) Int. Cl.
    *H04L 12/741* (2013.01)
    *H04L 12/54* (2013.01)
    *H04L 29/12* (2006.01)

(52) U.S. Cl.
    CPC ............. *H04L 45/745* (2013.01); *H04L 12/56* (2013.01); *H04L 45/74* (2013.01); *H04L 61/103* (2013.01)

(58) Field of Classification Search
    CPC ...... H04L 45/745; H04L 61/103; H04L 45/74; H04L 12/56
    See application file for complete search history.

(56) References Cited

U.S. PATENT DOCUMENTS

2003/0130832 A1 7/2003 Schulter et al.
2007/0047548 A1* 3/2007 Yazaki ................ H04L 63/1458
                                                                370/392
(Continued)

FOREIGN PATENT DOCUMENTS

CN        1988495       6/2007
CN       101159619      4/2008
(Continued)

OTHER PUBLICATIONS

Extended European Search Report dated Jun. 25, 2014 in corresponding European Patent Application No. 12854052.3.

(Continued)

*Primary Examiner* — Jackie Zuniga Abad
(74) *Attorney, Agent, or Firm* — Staas & Halsey LLP

(57) ABSTRACT

A packet forwarding method, includes: receiving an IP packet, and obtaining a destination IP address carried in the IP packet; obtaining an IP address of a next-hop device on a link from a routing table according to the destination IP address; obtaining a MAC address of the next-hop device and a corresponding port number according to the IP address of the next-hop device; and if failing to obtain the MAC address of the next-hop device and the corresponding port number, obtaining a corresponding interface on the routing device from the routing table according to the destination IP address, and obtaining the MAC address of the next-hop device and the corresponding port number from a fuzzy ARP table according to the interface; and forwarding the IP packet to the next-hop device according to the MAC address of the next-hop device and the port number.

9 Claims, 2 Drawing Sheets

(56) References Cited

U.S. PATENT DOCUMENTS

2007/0140264 A1    6/2007  Chen et al.
2010/0011139 A1*  1/2010  Wang ..................... H04L 12/66
                                                                       710/110
2011/0202658 A1*  8/2011  Okuno .................... G06F 9/505
                                                                       709/226

FOREIGN PATENT DOCUMENTS

CN           102217253      10/2011
EP            2362606       8/2011

OTHER PUBLICATIONS

PCT International Search Report and Written Opinion of the International Searching Authority dated Nov. 15, 2012 in corresponding International Patent Application No. PCT/CN2012/079705.
International Search Report mailed Nov. 15, 2012 in corresponding International Application No. PCT/CN2012/079705.

* cited by examiner

PACKET FORWARDING METHOD, APPARATUS, AND SYSTEM

CROSS-REFERENCE TO RELATED APPLICATIONS

This application is a continuation of International Application No. PCT/CN2012/079705, filed on Aug. 6, 2012, which claims priority to Chinese Patent Application No. 201110386699.6, filed on Nov. 29, 2011, both of which are hereby incorporated by reference in their entireties.

FIELD OF THE INVENTION

Embodiments of the present invention relate to the communication field, and in particular, to a packet forwarding method, apparatus, and system.

BACKGROUND OF THE INVENTION

A routing device performs layer 3 (L3) communication over different network segments through two steps:

1. Search a routing table on the current routing device according to a DIP (destination Internet Protocol, destination IP) address, match an NH (Next Hop, next-hop device) of a destination network segment, and match a default route if no route can be matched in the routing table.

2. Search a local ARP (Address Resolution Protocol, address resolution protocol) table on the current routing device according to the NH, and match a precise ARP entry; and if no precise ARP entry exists, send an ARP request to the NH, and after receiving a response message of the NH, learn and add an ARP entry of the NH to the ARP table for later query, and forward an IP packet on an Ethernet link after the routing device performs Ethernet header encapsulation for the IP packet according to the learned ARP entry.

If the current routing device has the above entries, the current routing device can successfully forward the IP packet to the NH, that is, the routing device must have an NH route to the destination network segment and an ARP entry of the NH, and the IP packet can be successfully sent to the NH on the link and then to a destination device only when the two conditions are satisfied. In the layer 3 forwarding process, the ARP entry of the NH needs to be learned before the IP packet can be forwarded. A delay occurs inevitably at the first time of packet forwarding. For a packet sensitive to the delay, for example, a voice packet, the delay in forwarding the packet affects the call quality, and if the ARP entry of any node on the forwarding path fails to be learned, for example, because an ARP entry conflict occurs or the ARP table is full, the service is interrupted because of packet loss.

SUMMARY OF THE INVENTION

An embodiment of the present invention provides a packet forwarding method, including:

receiving, by a routing device, an IP packet, and obtaining a destination IP address carried in the IP packet;

obtaining, by the routing device, an IP address of a next-hop device on a link from a routing table according to the destination IP address;

obtaining, by the routing device, a media access control MAC address of the next-hop device and a corresponding port number on the routing device according to the IP address of the next-hop device; and if failing to obtain the MAC address of the next-hop device and the corresponding port number on the routing device, obtaining a corresponding interface on the routing device from the routing table according to the destination IP address, and obtaining the MAC address of the next-hop device and the corresponding port number from a fuzzy address resolution protocol ARP table according to the interface; and forwarding, by the routing device, the IP packet to the next-hop device according to the MAC address of the next-hop device and the port number;

where the fuzzy ARP table records a mapping relationship between the interface, the port number, and the MAC address.

An embodiment of the present invention provides a routing device, including:

a receiving unit, configured to receive an Internet protocol IP packet, and obtain a destination IP address carried in the IP packet;

a processing unit, configured to: according to an IP address of a next-hop device, obtain a media access control MAC address of the next-hop device and a corresponding port number on the routing device; and if failing to obtain the MAC address of the next-hop device and the corresponding port number on the routing device, obtain a corresponding interface on the routing device from a routing table according to the destination IP address, and obtain the MAC address of the next-hop device and the corresponding port number from a fuzzy address resolution protocol ARP table according to the interface; and a sending unit, configured to forward the IP packet to the next-hop device according to the MAC address of the next-hop device and the port number;

where the fuzzy ARP table records a mapping relationship between the interface, the port number, and the MAC address.

An embodiment of the present invention provides a packet forwarding system, including a routing device, where:

the routing device is configured to receive an Internet protocol IP packet, and obtain a destination IP address carried in the IP packet; obtain an IP address of a next-hop device on a link from a routing table according to the destination IP address; obtain a media access control MAC address of the next-hop device and a corresponding port number on the routing device according to the IP address of the next-hop device; and if failing to obtain the MAC address of the next-hop device and the corresponding port number on the routing device, obtain a corresponding interface on the routing device from the routing table according to the destination IP address, and obtain the MAC address of the next-hop device and the corresponding port number from a fuzzy address resolution protocol ARP table according to the interface; and forward the IP packet to the next-hop device according to the MAC address of the next-hop device and the port number;

where the fuzzy ARP table records a mapping relationship between the interface, the port number, and the MAC address.

With the method, apparatus, and system provided by the embodiments of the present invention, when searching a precise ARP table fails, the MAC address of the NH and a local corresponding port may be obtained according to the interface, which can solve the delay or interruption problem of the layer 3 service and improve timeliness and reliability of layer 3 forwarding.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
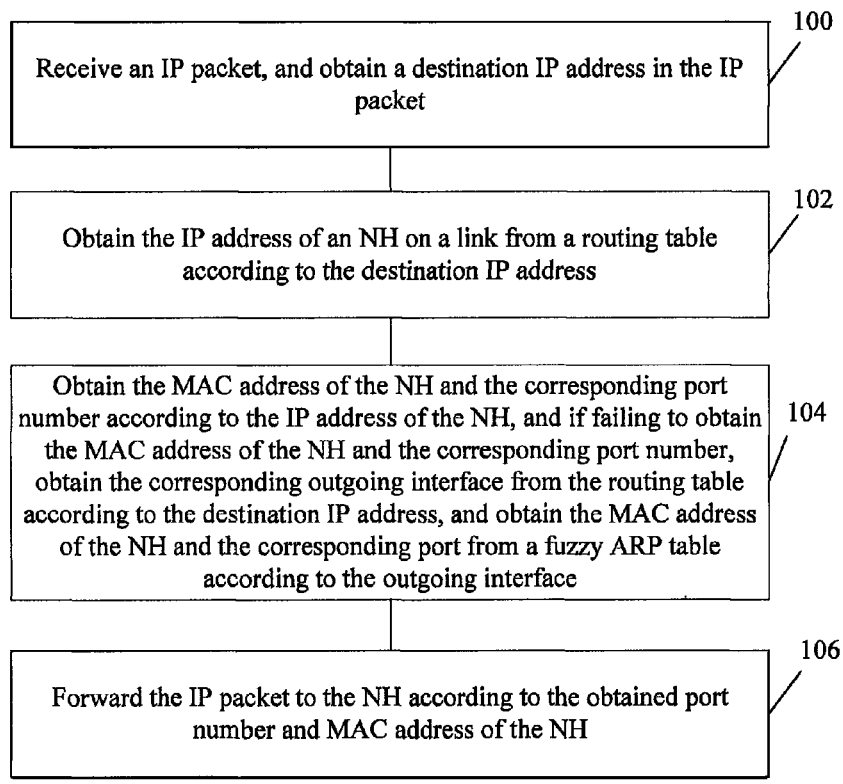
FIG. 1 is a flowchart of a method according to an embodiment of the present invention.

An embodiment of the present invention provides a packet forwarding method, as shown in FIG. 1, including:

Step 100: Receive an IP packet, and obtain a destination IP address in the IP packet.

A device corresponding to the destination IP address and a routing device may be in a same network segment or in different network segments. The routing device obtains the destination IP address carried in the IP packet after receiving the IP packet.

Step 102: Obtain an IP address of an NH on a link from a routing table according to the destination IP address.

Figure 2:
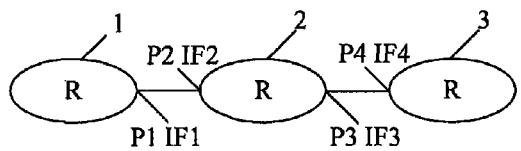
FIG. 2 is an architecture diagram of a system according to an embodiment of the present invention.

It is assumed that there are three routing devices: R1, R2, and R3, as shown in FIG. 2. R1 is connected to port P2 of R2 through port P1, and corresponding interfaces are IF1 and IF2 respectively; and R2 is connected to port P4 on R3 through port P3, and corresponding interfaces are IF3 and IF4 respectively. For R1, a MAC address is MAC1, and an IP address is 1.1.1.1/24; for R2, a MAC address is MAC2, and an IP address is 1.1.1.2/24; and for R3, a MAC address is MAC3, and an IP address is 3.3.3.2/24. In this case, the structure of the routing table may be shown in Table 1:

TABLE 1

| Routing Table | DIP/Mask | NH | OIF | Type |
|---|---|---|---|---|
| R1 | 3.3.3.3/24 | 1.1.1.2 | IF1 | Precise route |
|  | 0.0.0.0/0 | 1.1.1.2 | IF1 | Default route |
| R2 | 3.3.3.3/24 | 3.3.3.2 | IF3 | Precise route |
|  | 1.1.1.1/24 | 1.1.1.2 | IF2 | Precise route |
| R3 | 1.1.1.1/24 | 3.3.3.2 | IF4 | Precise route |
|  | 0.0.0.0/0 | 3.3.3.2 | IF4 | Default route |

It is assumed that R1 needs to forward the IP packet to a device with the destination IP address of 3.3.3.3/24, for example, R4 with a MAC address of MAC4, and that R4 is connected to R3 (not illustrated in FIG. 2). In this case, R1 searches the DIP column of the routing table for a corresponding IP address, and knows that the IP address of the NH is 1.1.1.2 and that the interface (OIF) is IF1.

Step 104: Obtain a MAC address of the NH and a corresponding port number according to the IP address of the NH, and if failing to obtain the MAC address of the NH and the corresponding port number, obtain a corresponding interface from the routing table according to the destination IP address, and obtain the MAC address of the NH and the corresponding port from a fuzzy ARP table according to the interface.

After obtaining the IP address of the NH, the routing device may obtain the MAC address of the NH and the corresponding port (OP) on the local routing device from an ARP table, where the ARP table may be shown in Table 2:

TABLE 2

| ARP Table | IP | MAC | OIF | OP | Type |
|---|---|---|---|---|---|
| R1 | 1.1.1.2 | IF2 MAC | IF1 | P1 | Precise ARP |
| R2 | 3.3.3.2 | IF3 MAC | IF3 | P0 (directed to the R2 CPU port) | Precise ARP |
|  | 1.1.1.2 | IF2 MAC | IF2 | P0 (directed to the R2 CPU port) | Precise ARP |
|  | 3.3.3.3 | IF4 MAC | IF3 | P3 | Precise ARP |
|  | 1.1.1.1 | IF1 MAC | IF2 | P2 | Precise ARP |
| R3 | 3.3.3.2 | IF3 MAC | IF4 | P4 | Precise ARP |

The ARP table (hereinafter referred to as a precise ARP table) records a mapping relationship between IP, MAC, OIF, and OP. After the IP address of the NH is obtained, the MAC address of the NH and the local corresponding port number may be obtained from the precise ARP table.

Still taking R1 as an example, the IP address of the NH obtained in step 102 is 1.1.1.2; in this case, it can be found from the precise ARP table that the MAC address of the NH is MAC2, and that the corresponding port (OP) on R1 is P1, and therefore R1 sends the IP packet to R2 through P1.

If the MAC address of the NH and the local corresponding port number fail to be obtained, the corresponding interface (outgoing interface) on the link is obtained from the routing table, and the MAC address of the NH and the corresponding port number are obtained from the fuzzy ARP table according to the outgoing interface. In this embodiment, the structure of the fuzzy ARP table may be shown in Table 3:

TABLE 3

| Fuzzy ARP | OIF | OP | DIP | NH MAC |
|---|---|---|---|---|
| R1 | IF1 | P1 | 0.0.0.0 | IF2 MAC |
| R2 | IF2 | P2 | 0.0.0.0 | IF1 MAC |
|  | IF3 | P3 | 0.0.0.0 | IF4 MAC |
| R3 | IF4 | P4 | 0.0.0.0 | IF3 MAC |

In this embodiment, the fuzzy ARP table records a mapping relationship between the interface, the MAC address, and the port number.

For example, the interface (outgoing interface) corresponding to the destination IP address 3.3.3.2/24 on R1 is IF1; if R1 fails to obtain the MAC address of the NH and the port number from the precise ARP table, the corresponding port number on R1 and the MAC address of the NH may be obtained from the fuzzy ARP table according to the obtained outgoing interface. In this embodiment, IF1 on R1 corresponds to port P1, the NH is R2, and the MAC address is MAC2.

The routing device forwards the IP packet to the NH according to the obtained port number and MAC address of the NH.

In the actual use process, the fuzzy ARP table and the precise ARP table may be a same table, or may be two separate tables. When they are the same table, the structure of the table may be shown in the following table, where a precise ARP entry is learned on R1, and a fuzzy ARP entry is learned on R2 and R3.

TABLE 3

| ARP Table | IP | MAC | OIF | OP | Type |
|---|---|---|---|---|---|
| R1 | 1.1.1.1 | IF1 MAC | IF1 | R1 P0 (directed to the R1 CPU port) | Precise ARP |
|  | 1.1.1.2 | IF2 MAC | IF1 | P1 | Precise ARP |
| R2 | 1.1.1.2 | IF2 MAC | IF2 | R2 P0 (directed to the R1 CPU port) | Precise ARP |
|  | 3.3.3.2 | IF3 MAC | IF3 | R2 P0 (directed to the R1 CPU port) | Precise ARP |
|  | 0.0.0.0 | IF4 MAC | IF3 | P3 | Fuzzy ARP |
|  | 0.0.0.0 | IF1 MAC | IF2 | P2 | Fuzzy ARP |
| R3 | 3.3.3.3 | IF4 MAC | IF4 | R3 P0 (directed to the R3 CPU port) | Precise ARP |
|  | 0.0.0.0 | IF3 MAC | IF4 | P4 | Fuzzy ARP |

Step 106: Forward the IP packet to the NH according to the obtained port number and MAC address of the NH.

After obtaining the MAC address of the NH, the routing device encapsulates the IP packet, and sends the IP packet to the NH through a port corresponding to the port number.

With the method provided by this embodiment, a fuzzy ARP table needs to created locally beforehand. The process may be as follows: A free ARP packet is sent to other devices when an interface on the routing device is activated, where the free ARP packet actively advertises IP address and MAC address information of the local routing device, so that other devices store a mapping relationship between a receiving port number, a receiving interface, and a MAC address of a peer device into the fuzzy ARP table after receiving the free ARP packet.

The routing device also receives free ARP packets sent by other devices, and stores the mapping relationship between the receiving port number, the receiving interface, and the MAC address of the peer device into the local fuzzy ARP table. If multiple free ARP packets are received from a peer end through the same interface and port sequentially, a MAC address in a corresponding ARP entry is refreshed to a MAC address of the last free ARP packet, that is, the same interface and port occupy only one ARP entry resource.

When the interface is in an active state, the fuzzy ARP entry may be not aged but is only refreshed; and when the interface is deactivated, an ARP entry corresponding to the interface may be deleted from the fuzzy ARP table.

For ease of searching, ARP entries may be sorted according to the interface, for example, in ascending order, when an ARP entry is added. The inserted entry is placed at the foremost position before the interface, and is also adjusted to the foremost position before the interface when being refreshed.

With the packet forwarding method provided by this embodiment, when searching a precise ARP table fails, the MAC address of the NH and a local corresponding port may be obtained according to the interface, which can solve the delay or interruption problem of the layer 3 service and improve timeliness and reliability of layer 3 forwarding.

Figure 3:
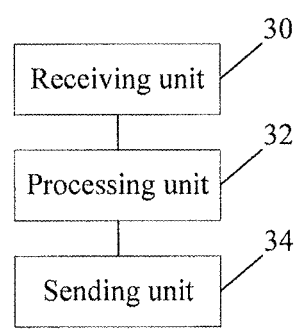
FIG. 3 is a schematic structural diagram of a routing device according to an embodiment of the present invention.

An embodiment of the present invention provides a routing device, as shown in FIG. 3, including a receiving unit 30, a processing unit 32, and a sending unit 34.

The receiving unit 30 is configured to receive an IP packet, and obtain a destination IP address carried in the IP packet.

The processing unit 32 is configured to: obtain an IP address of an NH on a link from a routing table according to the destination IP address; obtain a media access control MAC address of the NH and a corresponding port number according to the IP address of the NH; and if failing to obtain the MAC address of the NH and the corresponding port number, obtain a corresponding interface on the routing device from the routing table according to the destination IP address, and obtain the MAC address of the NH and the corresponding port number from a fuzzy ARP table according to the interface.

The sending unit 34 is configured to forward the IP packet to the NH according to the MAC address of the NH and the port number.

The processing unit 32 may specifically obtain the MAC address corresponding to the IP address of the NH and the port number from an ARP table, where the ARP table and the fuzzy ARP table may be a same table or two different tables, and the specific form is as described in the above embodiment.

The receiving unit 30 is further configured to receive a free ARP packet, where the free ARP packet carries an IP address and a MAC address of another device.

The processing unit 32 is further configured to obtain a number of a port receiving the free ARP packet, and record a mapping relationship between the obtained port number, the corresponding interface, and the MAC address carried in the free ARP packet into the fuzzy ARP table.

The processing unit 32 is further configured to delete an entry corresponding to the interface from the fuzzy ARP table when the interface is changed from an active state to an inactive state.

With the routing device provided by this embodiment, when searching a precise ARP table fails, the MAC address of the NH and a local corresponding port may be obtained according to the interface, which can solve the delay or interruption problem of the layer 3 service and improve timeliness and reliability of layer 3 forwarding.

Persons of ordinary skill in the art should understand that, all or a part of the steps of the methods in the above embodiments may be implemented by a program instructing relevant hardware. The program may be stored in a computer readable storage medium, such as a ROM/RAM, a magnetic disk, or an optical disk.

In conclusion, the above are merely specific embodiments of the present invention. However, the protection scope of the present invention is not limited thereto. Changes or replacements readily apparent to persons skilled in the art within the technical scope disclosed by the present invention shall fall within the protection scope of the present invention. Therefore, the protection scope of the present invention is subject to the protection scope of the claims.

What is claimed is:

1. A packet forwarding method, comprising:
    receiving, by a routing device, an Internet protocol (IP) packet, and obtaining a destination IP address carried in the IP packet;
    obtaining, by the routing device, an IP address of a next-hop device on a link from a routing table according to the destination IP address;
    obtaining, by the routing device, a media access control (MAC) address of the next-hop device and a corresponding port number on the routing device from a first address resolution protocol (ARP) table according to the IP address of the next-hop device; and if failing to obtain the MAC address of the next-hop device and the corresponding port number on the routing device, obtaining a corresponding interface on the routing device from the routing table according to the destination IP address, and obtaining the MAC address of the next-hop device and the corresponding port number on the routing device from a second ARP table according to the interface; and forwarding, by the routing device, the IP packet to the next-hop device according to the MAC address of the next-hop device and the port number;

wherein the first ARP table records a mapping relationship between the IP address of the next-hop device, the port number, the interface, and the MAC address; the second ARP table records a mapping relationship between the interface, the port number, and the MAC address.

2. The method according to claim 1, before the receiving an IP packet, further comprising:

sending, by the routing device, a free ARP packet through the interface, wherein the free ARP packet carries a MAC address and an IP address of the routing device.

3. The method according to claim 1, before the receiving an IP packet, further comprising:

receiving a free ARP packet, wherein the free ARP packet carries a MAC address; and storing a mapping relationship between a number of a port and an interface receiving the free ARP packet and the MAC address carried in the free ARP packet into the second ARP table.

4. The method according to claim 3, wherein when the interface enters an inactive state from an active state, an entry corresponding to the interface is deleted from the second ARP table.

5. A routing device, comprising:

a receiver, configured to receive an Internet protocol (IP) packet, and obtain a destination IP address carried in the IP packet;

a processor coupled to the receiver, configured to obtain an IP address of a next-hop device on a link from a routing table according to the destination IP address; obtain a media access control (MAC) address of the next-hop device and a corresponding port number on the routing device from a first address resolution protocol (ARP) table according to the IP address of the next-hop device; and if failing to obtain the MAC address of the next-hop device and the corresponding port number on the routing device, obtain a corresponding interface on the routing device from the routing table according to the destination IP address, and obtain the MAC address of the next-hop device and the corresponding port number from a second ARP table according to the interface; and a transmitter coupled to the processor, configured to forward the IP packet to the next-hop device according to the MAC address of the next-hop device and the port number;

wherein the first ARP table records a mapping relationship between the IP address of the next-hop device, the port number, the interface, and the MAC address; the second ARP table records a mapping relationship between the interface, the port number, and the MAC address.

6. The routing device according to claim 5, wherein:

the receiver is further configured to receive a free ARP packet, wherein the free ARP packet carries an IP address and a MAC address of another device on the link; and the processor is further configured to obtain a number of a port receiving the free ARP packet, and record a mapping relationship between the obtained port number, the corresponding interface, and the MAC address carried in the free ARP packet into the second ARP table.

7. The routing device according to claim 5, wherein the processor is further configured to delete an entry corresponding to the interface from the second ARP table when the interface enters an inactive state from an active state.

8. A packet forwarding system, comprising:

a routing device, configured to: receive an Internet protocol (IP) packet, and obtain a destination IP address carried in the IP packet; obtain an IP address of a next-hop device on a link from a routing table according to the destination IP address; obtain a media access control (MAC) address of the next-hop device and a corresponding port number on the routing device from a first address resolution protocol (ARP) table according to the IP address of the next-hop device; and if failing to obtain the MAC address of the next-hop device and the corresponding port number on the routing device, obtain a corresponding interface on the routing device from the routing table according to the destination IP address, and obtain the MAC address of the next-hop device and the corresponding port number from a second address resolution protocol ARP table according to the interface; and forward the IP packet to the next-hop device according to the MAC address of the next-hop device and the port number;

the next-hop device linked to the routing device, configured to receive the IP packet from the routing device;

wherein the first ARP table records a mapping relationship between the IP address, the port number, the interface, and the MAC address; the second ARP table records a mapping relationship between the interface, the port number, and the MAC address.

9. The system according to claim 8, wherein the routing device is further configured to receive a free ARP packet, wherein the free ARP packet carries an IP address and a MAC address of another device, obtain a number of a port receiving the free ARP packet, and record a mapping relationship between the obtained port number, the corresponding interface, and the MAC address carried in the free ARP packet into the second ARP table.

* * * * *